United States Patent
Sjostedt

(10) Patent No.: US 7,137,617 B2
(45) Date of Patent: Nov. 21, 2006

(54) COMPOSITE TENSIONING MEMBERS AND METHOD FOR MANUFACTURING SAME

(75) Inventor: Robbie J. Sjostedt, McKinney, TX (US)

(73) Assignee: Air Logistics Corporation, Monrovia, CA (US)

( * ) Notice: Subject to any disclaimer, the term of this patent is extended or adjusted under 35 U.S.C. 154(b) by 223 days.

(21) Appl. No.: 10/197,947

(22) Filed: Jul. 16, 2002

(65) Prior Publication Data

US 2003/0010966 A1    Jan. 16, 2003

Related U.S. Application Data

(60) Provisional application No. 60/305,931, filed on Jul. 16, 2001.

(51) Int. Cl.
*B21F 9/00*    (2006.01)

(52) U.S. Cl. ............... 254/199; 403/217; 403/266; 403/368; 24/136 R; 24/136 L

(58) Field of Classification Search .......... 254/199; 403/367, 368, 10, 202, 217–219, 266, 270; 24/122.3, 122.6, 135 R, 136 R, 136 L; 29/897
See application file for complete search history.

(56) References Cited

U.S. PATENT DOCUMENTS

| | | | | |
|---|---|---|---|---|
| 1,392,480 A | * | 10/1921 | Clarke | 403/275 |
| 1,843,360 A | * | 2/1932 | Handel | 403/368 |
| 2,087,384 A | * | 7/1937 | Lee | 174/72 R |
| 2,650,129 A | * | 8/1953 | Axelsen | 294/86.14 |
| 2,665,331 A | * | 1/1954 | Berndt | 174/94 S |
| 3,147,527 A | * | 9/1964 | Gilmore | 403/368 |
| 3,475,795 A | * | 11/1969 | Youngblood | 24/122.6 |
| 3,596,940 A | * | 8/1971 | Horwitt et al. | 403/360 |
| 3,600,765 A | * | 8/1971 | Rovinsky et al. | 24/122.6 |
| 3,739,457 A | * | 6/1973 | Davis | 29/460 |
| 3,877,523 A | | 4/1975 | Ely | |
| 3,958,523 A | | 5/1976 | Holmes et al. | |
| 4,043,690 A | | 8/1977 | Browne | |
| 4,066,368 A | * | 1/1978 | Mastalski et al. | 403/211 |
| 4,275,537 A | | 6/1981 | Pinson | |
| 4,494,890 A | * | 1/1985 | Lusk | 403/267 |
| 4,507,008 A | * | 3/1985 | Adl et al. | 403/275 |

(Continued)

FOREIGN PATENT DOCUMENTS

GB    2236546 A    4/1991

OTHER PUBLICATIONS

Supplemental European Search Report, Application No. EP 02750142 -PCT/US0222840, May 31, 2006; 3 pages.

*Primary Examiner*—Emmanuel M Marcelo
(74) *Attorney, Agent, or Firm*—Christie, Parker & Hale, LLP.

(57)    ABSTRACT

A composite tension member. The composite tension member is assembled from a number of composite rods, each having two ends. A wedge plug is formed around the ends of the composite rods. The wedge plugs are inserted into termination fitting having a termination fitting body with an aperture at a proximal end for receipt of the bundle of composite rods and having an internal cavity that flares outwardly from a proximal end to a distal end to closely receive the wedge plug with the composite rods imbedded therein. A closeout nut is used to retain the wedge plug in the termination fitting body. The invention further provides method of manufacturing composite tension members.

23 Claims, 13 Drawing Sheets

U.S. PATENT DOCUMENTS

| | | | |
|---|---|---|---|
| 4,596,486 A * | 6/1986 | Niederer, Sr. ............... 403/268 |
| 4,620,498 A | 11/1986 | Clausin |
| 4,643,609 A * | 2/1987 | Biass ......................... 403/369 |
| 4,740,101 A * | 4/1988 | Allen ........................ 403/374.4 |
| 4,755,076 A * | 7/1988 | Salama et al. .............. 403/275 |
| 4,759,103 A | 7/1988 | Henderson |
| 4,766,831 A | 8/1988 | Johnston |
| 5,022,780 A * | 6/1991 | Shaw ......................... 403/275 |
| 5,136,755 A * | 8/1992 | Shaw ......................... 24/122.6 |
| 5,141,356 A * | 8/1992 | Chaize ....................... 403/368 |
| 5,415,490 A | 5/1995 | Flory |
| 5,470,632 A | 11/1995 | Meldner et al. |
| 5,525,003 A | 6/1996 | Williams et al. |
| 5,630,301 A * | 5/1997 | Sieg ........................ 52/223.13 |
| 5,713,169 A | 2/1998 | Meier et al. |
| 5,908,261 A | 6/1999 | Bush et al. |
| 6,513,287 B1 * | 2/2003 | Sorkin ..................... 52/223.13 |
| 6,560,939 B1 * | 5/2003 | Sorkin ..................... 52/223.13 |
| 6,718,707 B1 * | 4/2004 | Marshall .................. 52/223.13 |
| 6,733,203 B1 * | 5/2004 | Carlsen et al. ............. 403/365 |
| 6,817,148 B1 * | 11/2004 | Sorkin ..................... 52/223.13 |

\* cited by examiner

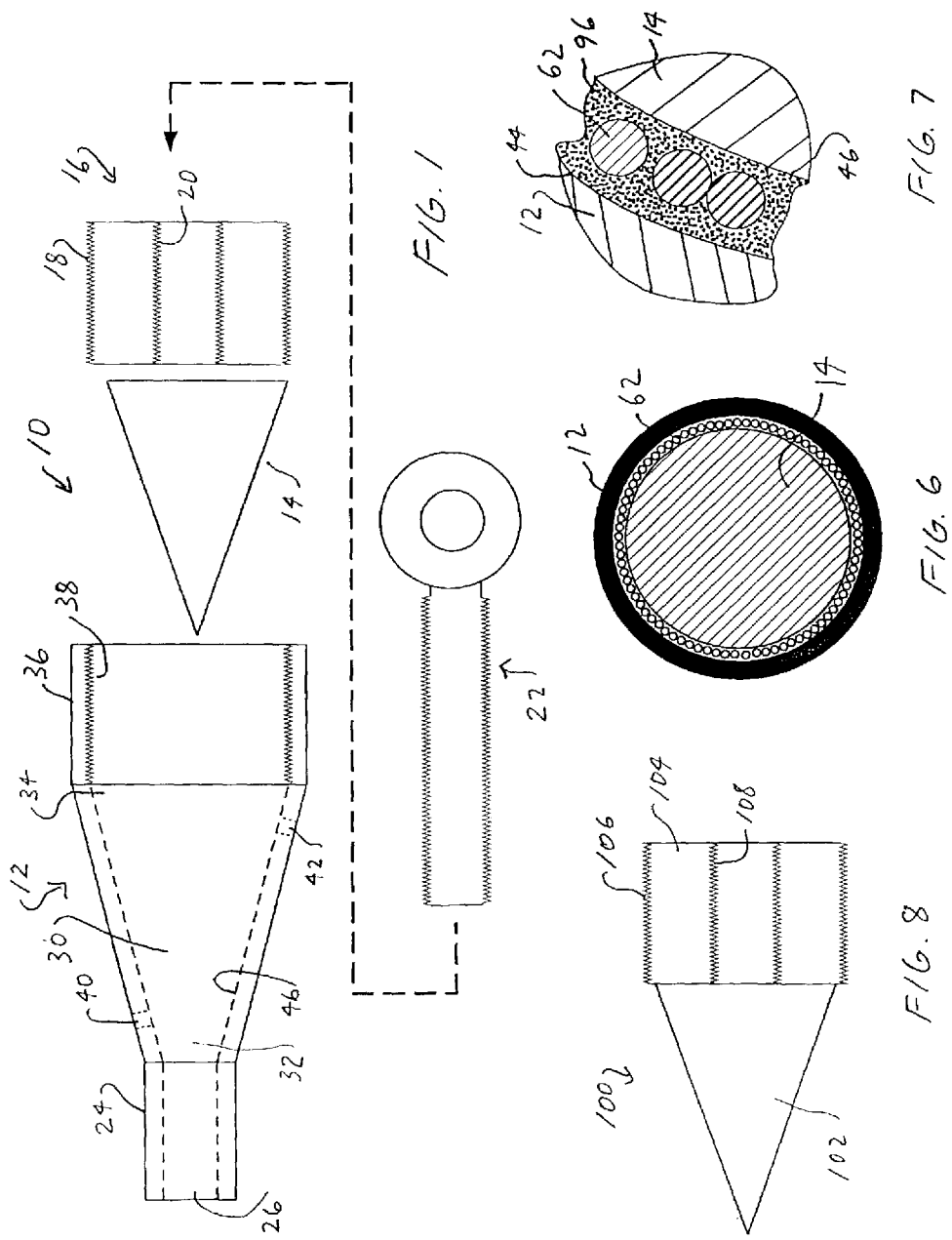

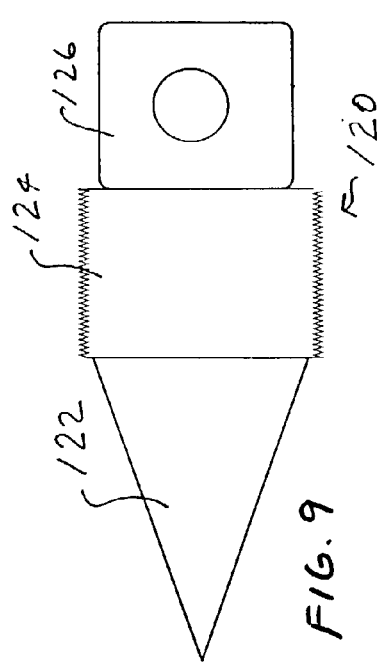
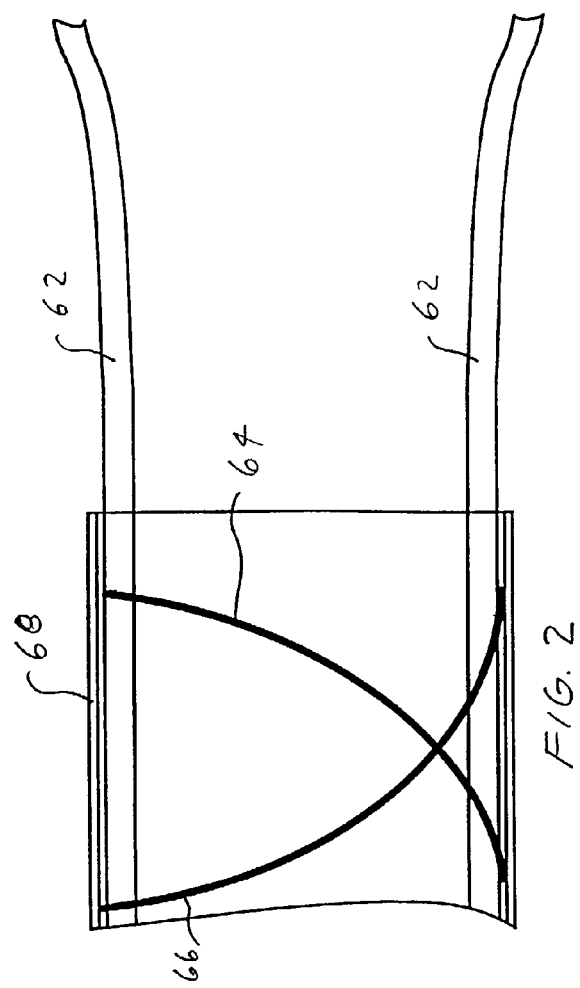
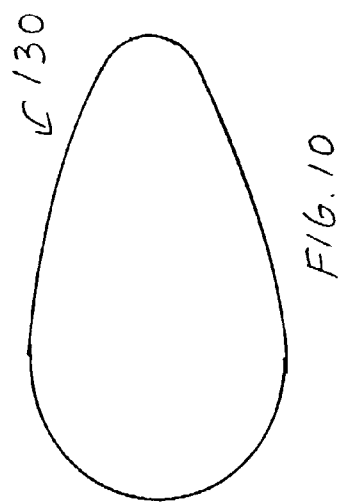
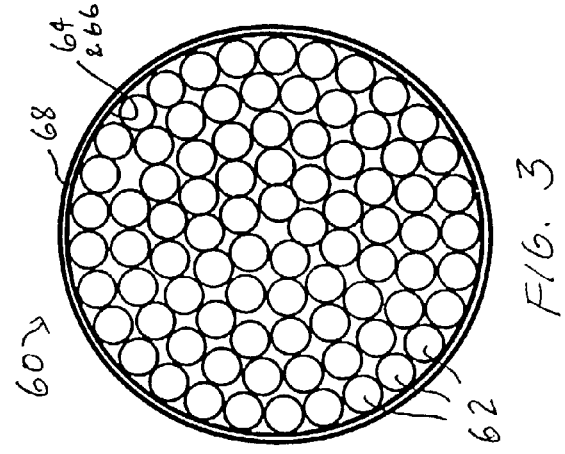

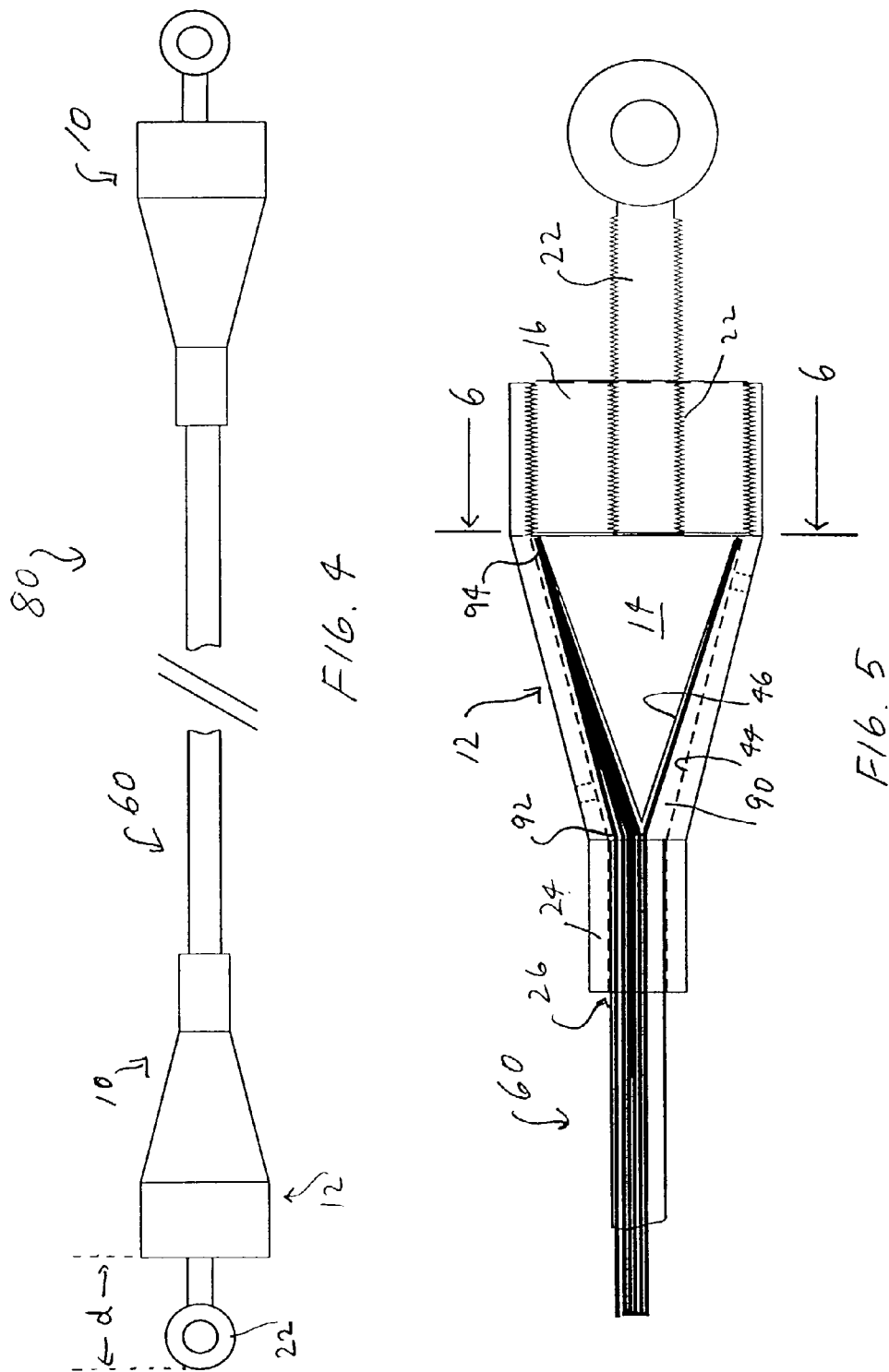

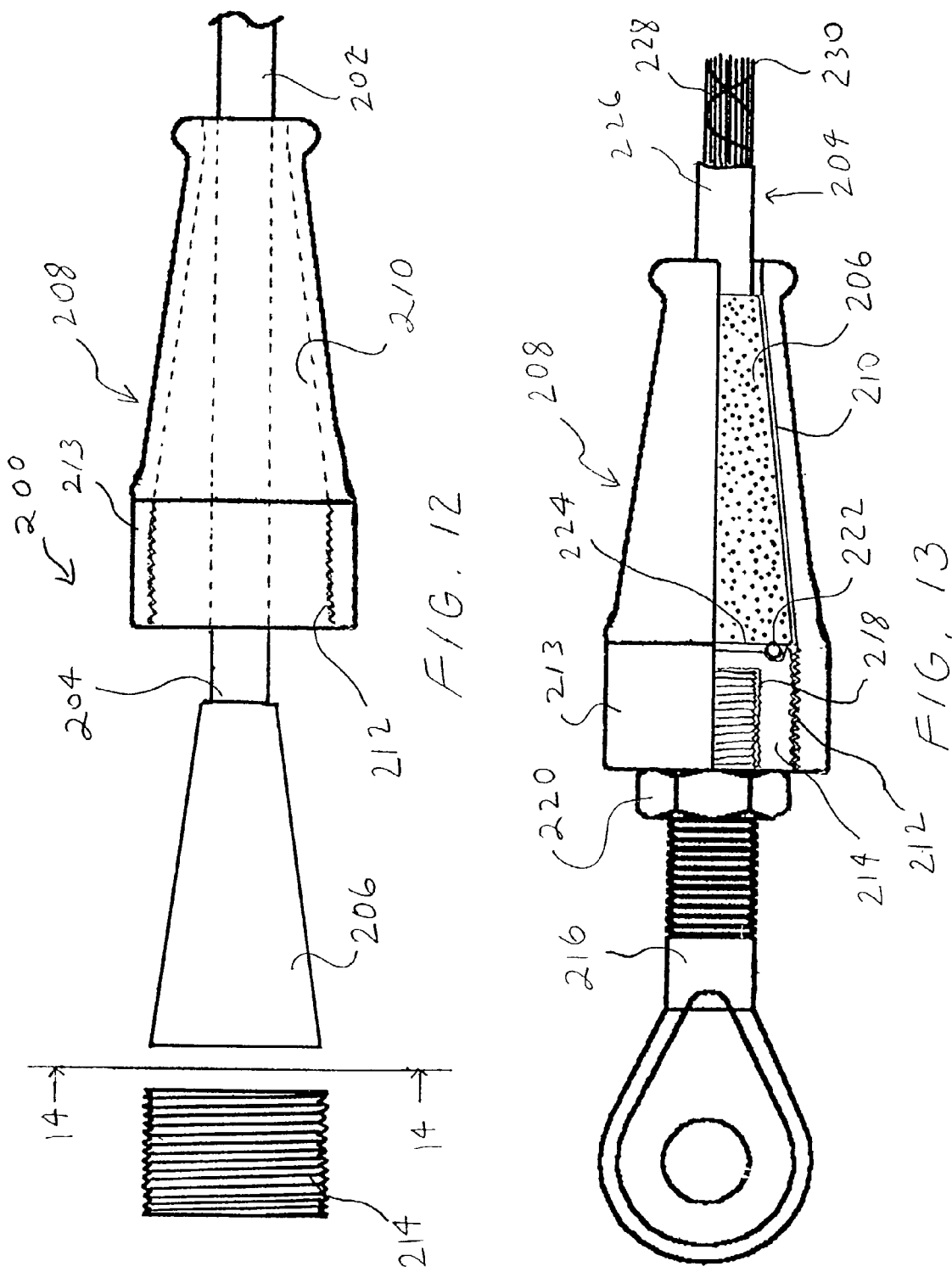

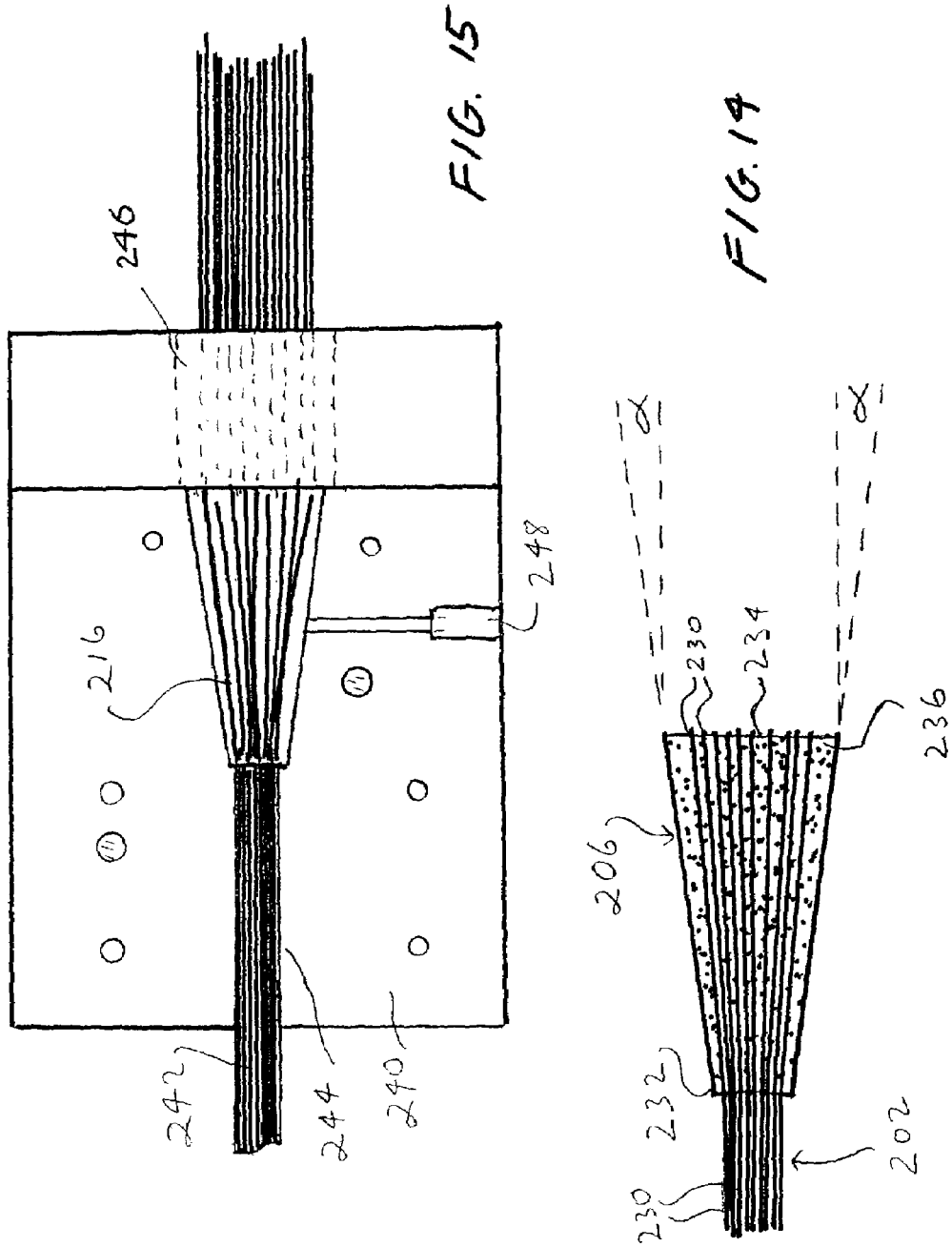

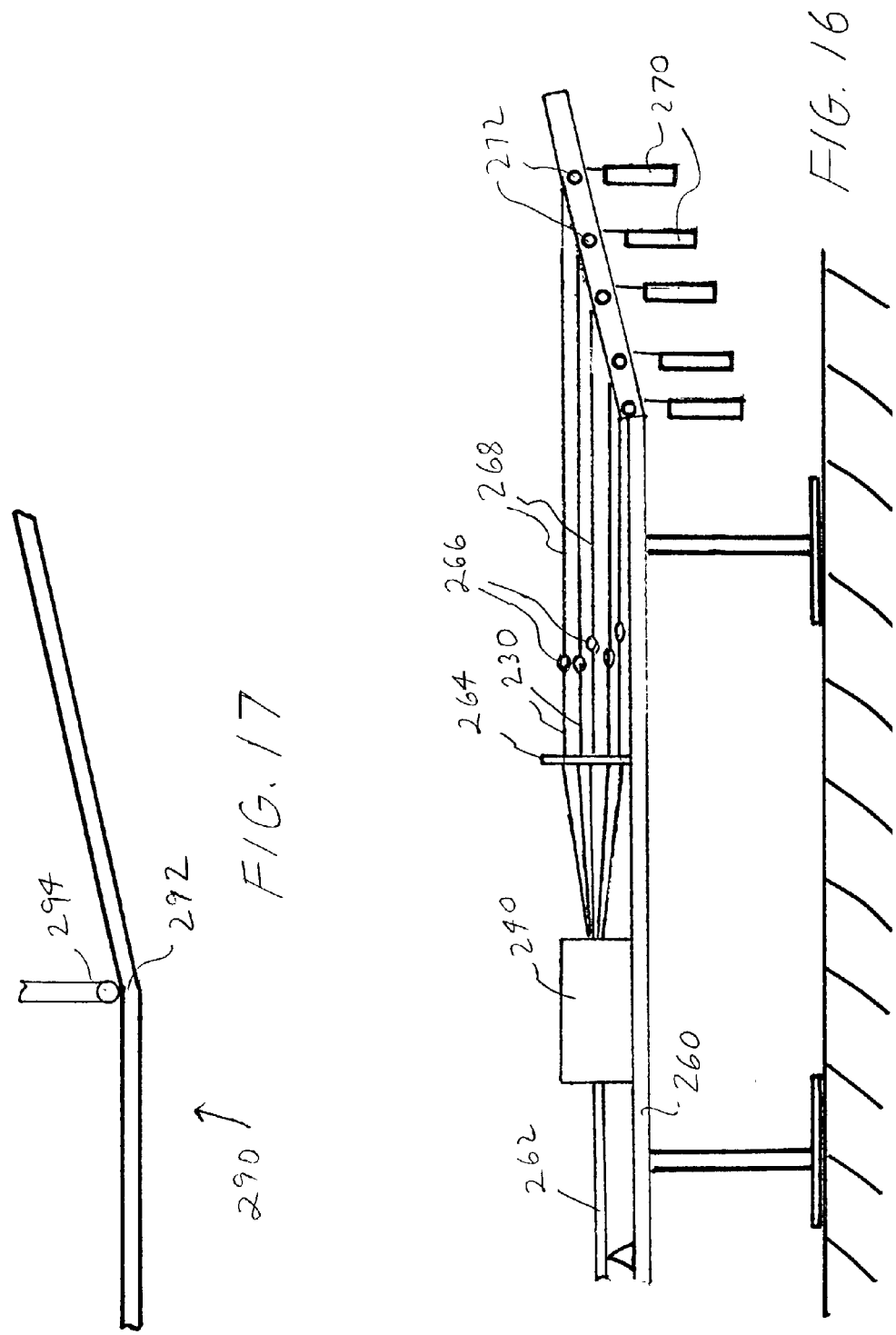

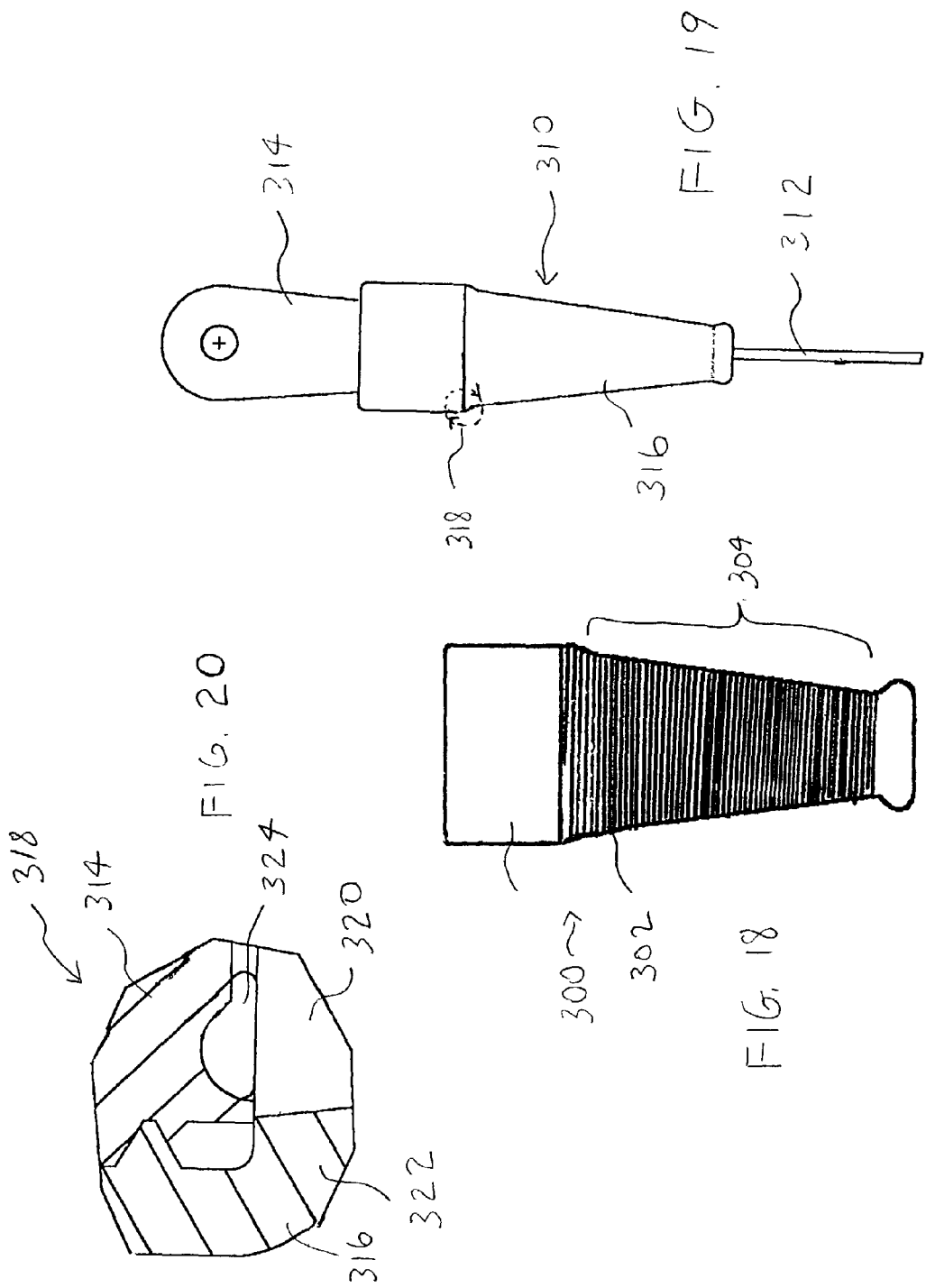

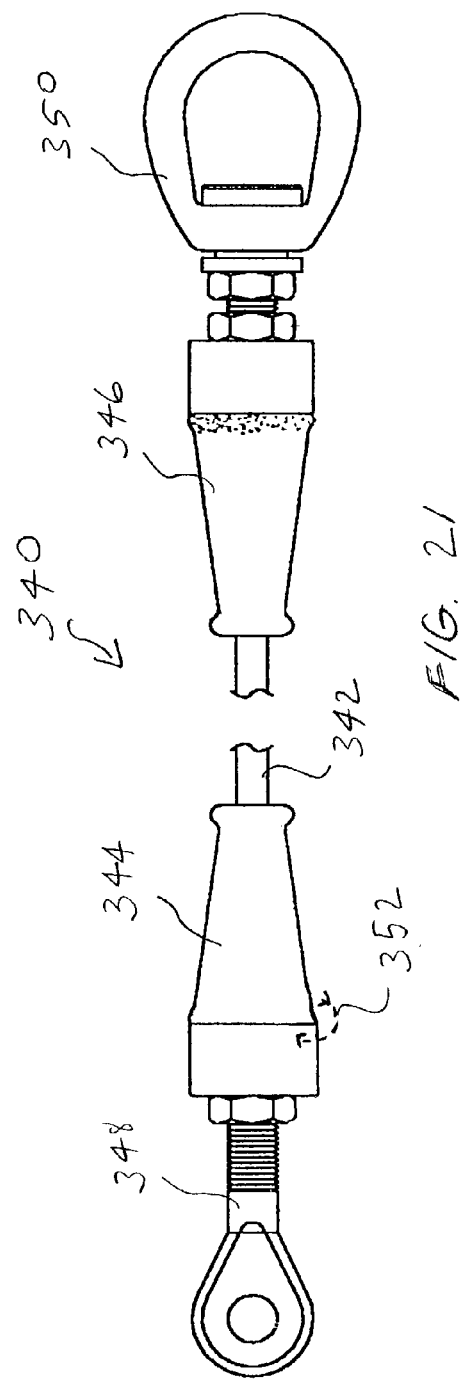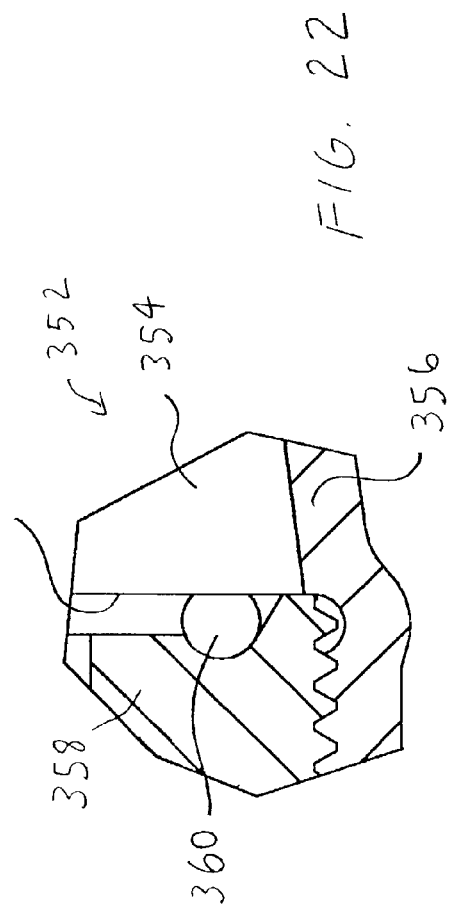
FIG. 21
FIG. 22

COMPOSITE TENSIONING MEMBERS AND METHOD FOR MANUFACTURING SAME

This application claims priority pursuant to 35 U.S.C. §119(e) and 37 CFR §1.78(a)(4), to provisional Application No. 60/305,931, filed Jul. 16, 2001.

BACKGROUND OF THE INVENTION

A composite tension member and method for manufacturing same, and more particularly a composite tension member formed of a plurality of parallel composite fiber rods bundled together in an intermediate composite cable portion with the rods either splayed out into termination fittings by a cone and attached thereto with adhesives and by friction forces, or imbedded in a wedge or frustum plug, which wedge or plug is fitted into a termination fitting.

There are a variety of applications which require strong yet lightweight tension members, such as standing rigging members for sailboats, industrial structure bracing, lifting cables, mooring cables for offshore drilling platforms, and bridge tendons, to name a few.

Particularly in performance-sensitive areas such as competitive sailboat racing, the ability to provide high tensile strength, lightweight and small-profile tension members is particularly attractive since reducing the weight above the deck of a vessel and reducing the profile of the rigging will reduce windage, and therefore give the sailboat a competitive advantage. Presently, in the yachting world, rigging material such as stainless steel cable and stainless steel rod is widely used for holding the mast upward keeping the mast to the desired straightness or degree of bend. When stainless steel cable sailboat rigging is constructed, the individual strands of the cable can be attached to terminating fittings on the end of the cables, e.g., by mechanical clamping or swaging. Although stainless steel cable and stainless steel rod are relatively strong, they suffer from various drawbacks. First, stainless steel, while strong, is still relatively heavy. Also, stainless steel cable and rod are subject to stretching (either elastic or permanent deformation). Furthermore, there are often situations where the stainless steel cable or rod do not extend along completely straight runs, and must bend at certain points. These bends create localized areas of weakness. For example, in sailboat applications, certain stainless steel cables and rods pass are used as continuous upper shrouds, where they pass around mast spreaders, and are angled in these areas. In these cases, the cables and rods are weakened where they pass around the end of the spreaders, thereby compromising the strength of the continuous upper shrouds.

Other problems with stainless steel rigging are corrosion and work hardening. Until about twenty years ago, stainless steel wire rope for standing rigging was the norm. However, wire rope experiences "permanent stretch" which is caused by settling of the wires in the rope or strand as an initial load is applied. While some permanent stretch is removed during the wire rope manufacturing process, a tension member made of wire rope almost always needs to be re-tensioned after some use. Because of these problems, there was a shift to using stainless steel rod for sailboats and other performance-driven applications. The advantages of stainless steel rod are less stretch and higher strength than stainless steel wire rope. This is because rod has more cross sectional material for a given diameter and there is not the stretch effect of a twisted wire rope. However, when the shift was made to stainless steel rod rigging there were numerous failures. There were two primary reasons for rod rigging failures. First, dew and salt water would get down into the termination fitting and cause stress corrosion cracks. Second, there were work hardening fatigue failures. The fatigue failures resulted from the rod rigging not being flexible like wire rope at the terminations. Consequently, the rod was continuously bent back and forth where the termination at the mast became very rigid. Others have attempted to address this problem by providing flexible joints for the end of the rod rigging with some success. In contrast to stainless steel, carbon composite has a much improved fatigue life, and will not experience stress corrosion cracking.

Another problem with metals is that they begin to yield at a lower level before they ultimately fail. In contrast, carbon composites keep accepting load and perform as designed without yielding almost right up to their failure point.

Directional composite materials such as carbon fiber, glass fiber, Kevlar® fiber, Aramid fiber, or other fibers, combined with a polymer resin matrix, offer very high tensile strength with less weight than conventional metallic materials. The means to manufacture monolithic rod members from composite members of suitable size to handle the tensile load required, for example, of sailboat masts, has been in existence for some time. However, it is difficult to attach termination fittings to a large monolithic composite rod. Conventional methods of attaching termination fittings to steel riggings, such as swaging, will not work for composite materials because the swaging operation will crush the composite monolithic rod. Adhesive bonding for connecting monolithic composite rods to termination fittings at each end for a rigging member does not have sufficient tensile strength except for small rod sizes (e.g., 3 millimeters (⅛") diameter or less) where the composite rod tensile strength does not exceed the strength of available adhesives. Moreover, in situations where the tension member will be locally bent, weaknesses are created. There accordingly remains a need for a solution to these problems.

SUMMARY OF THE INVENTION

The invention provides tension cable members comprising a plurality of parallel composite rods bundled together into an intermediate composite cable portion and wedges or frustum inserts into which the terminal ends of the composite rods are slightly splayed and embedded therein, which wedge or frustum plugs are tightly held in termination fittings by an interference fit.

The invention further provides tension cable members comprising a plurality of composite rods bundled together into an intermediate composite cable portion and termination fittings into which the ends of the plurality of rods are splayed out into by a metallic wedge ball or cone and frictionally engaged and glued thereto.

The invention further provides tension cable members comprising a single composite rod forming an intermediate composite cable portion and frustum plugs into which the terminal ends of the composite rod are embedded. The frustum plugs are tightly held in termination fittings by an interference fit.

The termination fitting comprises a termination fitting body formed of a strong material, such as stainless steel, titanium, and other metals. The termination fitting body has a frustum shaped cavity formed with a smaller diameter proximal end a larger diameter distal end. The bundle of composite rods passes through the smaller diameter proximal end. The ends of the bundle of composite rods are slightly splayed and cast into a frustum shaped plug, which frustum plug can be comprised of epoxy reinforcing fibers and fillers and other high strength resins. The frustum plug is sized and shaped to closely fit into the frustum cavity of the termination fitting body. As the tension member is placed under tension, the frustum plug is drawn further into the frustum cavity of the termination fitting body. This acts to further compress the frustum plug and places compressive forces on the composite rods which increases the lap shear adhesion of the rods to the frustum plug. The modulus of the frustum plug also increases with tensile load on the member.

The termination fitting body captures and holds the resin frustum plug under a tensile load. The termination fitting body also provides a means of attaching the tension member ends to whatever is being held or restrained by the tension member. In the case of the composite yacht standing rigging, the termination fitting body interfaces with the mast and/or boat hardware.

The termination fitting can further comprise a termination fitting body formed of a strong material, such as stainless steel, titanium, and aluminum, having a proximal end into which the bundle of composite rods enters and an internally flared cavity into which the plurality of rods extend. A metallic cone insert ball or mold tooling is utilized to splay the plurality of composite rods outwardly into close proximity with the internally flared cavity, and provides bonding surface area. Retention means, such as closeout collar nut, is used to retain the metallic cone insert within the cavity splaying out the plurality of composite rods. Ports for injecting adhesive into the space between the metallic cone insert and the cavity of the termination fitting body are provided into which the adhesive can be injected, and thereby adhere the individual rods to the surface of the core frustum and the inside surface of the flared cavity, thereby adhering the rods to each other and to the termination fitting body. The frustum may also be molded by injecting adhesive into a mold. The closeout collar nut will retain the metallic cone or frustum in place and the closeout collar nut has engagement means, such as threads, to receive an eye hook for a turnbuckle or other attachment member. In turn, the closeout collar nut could itself have an attachment means, such as an eye hook, unitary therewith.

The termination fittings are preferably affixed at both ends of the composite cable portion. The intermediate cable portion has a plurality of smaller diameter composite rods bundled together and preferably overlaid with the means to retain the rods together in a desired cross section profile, such as a circular profile, a generally airfoil-shaped profile, a teardrop-shaped profile, or other desired profiles. Alternately, the rods can be bundled into a generally circular profile, and any desired profile, and a generally airfoil shape sheathing can be extruded or affixed onto the bundle. By making the composite cable portion out of a collection of small composite rods aligned axially in lieu of the single monolithic rod, it is possible to securely affix termination fittings at each end of the tension member. The small composite rods are slightly splayed out within the resin frustum in the termination fitting.

The invention further provides a method of manufacturing long lengths of composite tension members having equalized tension on each composite rod in the bundle of rods.

A composite tension member of the invention can have a tensile strength that is twice that of conventional stainless steel cable or rod at about one-fourth the weight or with less profile. Reducing the rigging weight for a sailboat, for example, allows less keel weight to be used to offset for the weight aloft. Overall weight reduction make the sailboat sail faster. Also, since the composite rigging is stronger than steel, the option exists for yacht designers to reduce the rigging member diameter and profile, thereby reducing the windage and drag for the yacht. In other applications where a high strength to weight ratio and corrosion resistance is important, such as in mooring cables for offshore drilling platforms and bridge tendons the invention provides a great improvement.

BRIEF DESCRIPTION OF THE DRAWINGS

FIG. 1 is an exploded view showing an embodiment of a termination fitting of the invention.

FIG. 2 is a partial cross-sectional view of a composite rod bundle forming an intermediate composite cable portion of the composite cable tension member.

FIG. 3 is a cross-sectional view of the composite rod bundle of FIG. 2 showing all the composite rods.

FIG. 4 is a plan view of an embodiment of a tension member of the invention.

FIG. 5 is a detailed cross-sectional view showing the composite rod bundle interconnecting with a termination fitting.

FIG. 6 is a cross-sectional view through view lines 6—6 of FIG. 5, showing the interconnection between the individual composite rods, the insert cone and the terminating body.

FIG. 7 is a detail of FIG. 6 showing the composite rods glued to the termination housing and the cone frustum.

FIG. 8 is a plan view of an optional combination collar/collar nut assembly.

FIG. 9 is a plan view of an optional combination collar insert/attachment fitting.

FIG. 10 is a cross-sectional view showing an alternate profile of the composite rod bundle.

FIG. 12 is a top plan view showing another embodiment of a terminating fitting end of the composite tension member of the invention prior to assembly.

FIG. 13 is a partially exposed top plan view showing the terminating fitting of FIG. 12 assembled and engaged with an eyehook.

FIG. 14 is a cross-sectional view of the frustum plug taken along view lines 14—14 of FIG. 12.

FIG. 15 is a top plan view showing a part of a mold for forming frustum plugs with embedded composite rods locked therein.

FIG. 16 is a diagrammatic view showing a horizontal setup for forming composite tension members of the invention.

FIG. 17 is a diagrammatic view showing a setup for forming composite tension members having a non-weakening bend along the length of the cable portion.

FIG. 18 is a top plan view showing a termination fitting overwrapped with a high strength wrapping to provide enhanced hoop strength.

FIG. 19 is a top plan view showing a termination fitting with a cable portion having a unitary composite rod construction.

FIG. 20 is a detail of a portion of the termination fitting of FIG. 19.

FIG. 21 is a top plan view showing an assembled composite tension member of the invention.

FIG. 22 is a detail of a portion of the termination fitting of FIG. 21.

DETAILED DESCRIPTION OF THE INVENTION

Figure 11:
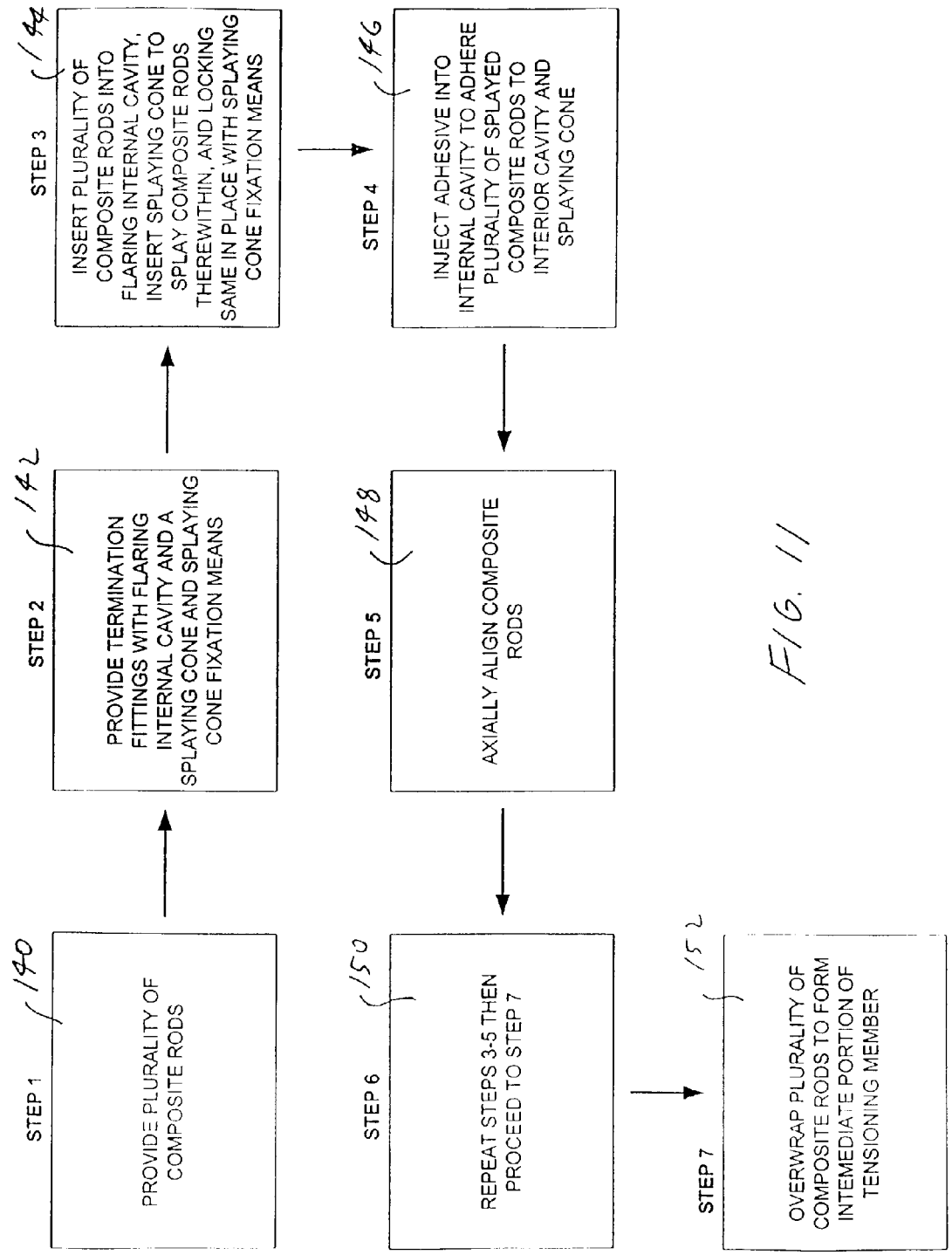
FIG. 11 is a flow chart showing a method of forming the tension members of the invention.

Turning to FIG. 1, there is shown an exploded view of the termination fitting end 10 which comprises a termination fitting body 12, a deflecting or splaying means, such as a cone insert 14, and a means to secure the cone insert 14, such as a closeout collar nut. Closeout collar nut 16 has external threads 18 and an internally threaded hole 20. A threaded eyehook portion 22 of a turnbuckle portion is sized and threaded to be threadably engagable with internal threads 20 of the closeout collar nut. Cone insert 14 is preferably constructed of a strong and rigid material such as stainless steel, aluminum, titanium, and some other strong material. Termination fitting body 12 has a proximal end 24 with an axial bore 26 formed therethrough. An intermediate portion 28 of termination fitting has a flared interior cavity 30 which flares outwardly from its proximal end 32 to its distal end 34 to define a frusto-conical shaped cavity. Termination housing has a distal end 36 which has attachment means 38, such as female threads, which are complementary to the attachment means 18 of closeout collar nut 16. Alternatively, externally placed threads can be placed on the distal end 36 and the closeout collar nut can be replaced by a threaded cap, or some other attachment means can be used (not shown). As shown in FIGS. 1 and 5, cone insert 14 has a less steep cone shape than the flaring angles of internal cavity 32 of intermediate portion 28 of termination fitting body 12. Termination fitting body 12 preferably has an adhesive intake aperture 40 formed at one end of the intermediate portion 28, and a venting aperture 42 formed at another end of the intermediate portion. The relative number and position of the adhesive intake and venting ports can be greater than one if desired. During the manufacture of termination housing 12 and cone insert 14, inside wall surfaces 44 of flaring cavity 30 and outside surfaces 46 of cone insert 14 can be treated for enhanced adhesion by bead blasting or rough sanding, preferably followed by a light layer of epoxy adhesive being applied to surfaces thereof, followed by scuffing, to form enhanced adhesive surfaces. Although deflecting the individual rods within the cavity is one preferred way to enhance the surface contact area, other means can be used to enhance the adhesive surface area between the plurality of composite rods and the termination housing, so that the shear load is distributed over a greater surface area. In general, the termination fitting body can have an internal cavity with an adhesive bonding area with an enlarged surface bonding area for bonding of the plurality of composite rods to the enlarged bonding surface area, and a means to deflect the individual composite rods so that they are brought into the vicinity of the enlarged bonding surface area, wherein the adhesive bond strength between the composite bonds and the housing is at least as great as the strength of the composite rods.

Turning to FIG. 2, there is shown a partially exposed cross-sectional view of a terminal end section of a bundle of composite rods 60. Composite rods can be formed of carbon-fiber, and resin fiberglass and epoxy, and other known fibers and known resins. FIG. 3 is a cross-sectional view showing a plurality of composite rods 62 surrounded by a binding threads 64 and 66 wound counter-helically. For clarity of presentation, only two of the counter-helically round threads are shown in FIG. 2, and only two composite rods 62 are shown in FIG. 2. Preferably, the thread-bound bundle of composite rods 62 are overlaid with a weatherproofing and waterproofing layer 66, such as with neoprene, or silicone, or PTFE (polytetrafluoroethylene) film to provide weathering and damage protection. Threads can preferably comprise a strong material such as Kevlar® (poly-para-paraphenylene terephthalate). Other strong wrapping material could alternately be used, including Aramid (synthetic polyamide) fibers. In lieu of strong thread, a tape-type wrap could also be utilized, and a shrink wrap material and/or permanently applied coating could be applied to the intermediate portion of tension member.

Turning to FIG. 4, there is shown a top plan view of a composite tension cable member 80 showing the termination fittings 10 connected to the composite cable portion 60. As shown, eyescrew 22 of turnbuckle is engaged with termination bodice 12. The rest of the turnbuckles are not shown. The distance "D" that eyescrew extends from terminal housing 12 is adjustable, thereby being useful for changing the tension placed on the composite tension cable member 80. Alternately, other attachment means can be provided where a separate turn buckle or other adjustment is made to provide further tension to the composite tension cable member 80.

Referring to FIG. 5, there is shown a partially exposed view showing bundle of composite rods 60 engaged with terminating housing 12. For clarity of presentation, FIG. 5 is shown with only some of the composite rods. In actuality, the composite rod cable portion rod 60 would have a complete density of rods as shown in FIG. 3 and would more fully fill space 90. As shown, individual composite rods 62 extend through opening 26 in proximal end 24 of termination housing, and flare outwardly into the rod receiving space 90 formed between outer faces 46 of insert core 14 and inside wall 44 of cavity 30. As can be seen, as a result of the different slope angles of insert core 14 and flared cavity 30, the space 90 between rod receiving walls 44 and 46 is wider at a front portion 92, and this decreases towards a rear portion 94 of space 90. The reason for this is that the density of individual rods 92 is greater near where the plurality of rods enter the cavity 90 than at the distal end.

FIG. 6 is taken along view line 6—6 of FIG. 5 and shows insert core 14 and the close proximity of rods 62 with inside walls 44 of cavity 30 and outside wall surface 46 of cone insert 14. Adhesive 96 binds composite rods 62 to each other and to insert core 14 and inside walls 44 of termination body. Adhesive filling port 40 can preferably be threaded to have a Zerk-type fitting wherein adhesive under pressure can be squirted into the space 90 and thereby interfill spaces between individual rods 62 and the walls of the terminal housing and insert frustum, thereby providing for adhesion. Closeout collar nut 16 can be screwed in tightly so as to push on insert core 14 and cause the individual rods 62 to be compressed and frictionally engaged with the terminal housing and insert frustum. Furthermore, when space 90 is filled with adhesive 96 under pressure, the adhesive will cause in-filling to occur, forming a generally frustum-shaped mass of the adhesive and composite rods. This core-shaped mass is not only adhesively locked in place by pressure exerted by insert core being compressed by collar nut 12, it also provides a structure which cannot be withdrawn from the terminal housing, and thereby provides an extremely secure and slip-free engagement between the bundle of rods and terminal housing 10

While FIG. 6 shows a single ring of rods formed within space 90, which preferably will occur at the terminal ends of the composite rods 62. However, further to the proximal end of termination housing, the density of rods is higher as the rods are being flared outwardly.

FIG. 7 is a detail showing rods 62 adhered with adhesive 96 to wall 44 and 46 of terminating housing 12 and insert core 14, respectively.

Turning to FIG. 8, there is shown a combination of core/collar nut 100, where insert core portion 102 is integral with a collar nut portion 104, wherein collar nut portion 104 preferably has external threads 106 and an internally-threaded bore 108 for engagement with an eyescrew of a turnbuckle or other engagement means.

FIG. 9 shows an alternate embodiment for a combination cone insert/hook member 120 which has a cone insert portion 122, a threaded central portion 124 and an eyelet portion 126.

Although terminating fitting is shown as having housing 12 with a female threaded distal end and an outside threaded collar nut, other means can be used to compress a friction engaging means comprising a frustum or other structure within a cavity to thereby compress and immobilize a plurality of rods within the cavity and flaring out therefrom.

Besides the bundle of composite rods 60 having a circular profile, it can have other profiles, such as tear-drop shape profile 130, as shown in FIG. 10, where aerodynamics is a consideration, such as in competitive sailboat racing.

Turning next to FIG. 11, there is shown a flow chart describing the process of forming tension members of the invention. In step 1, 140, a plurality of composite rods is provided having a predetermined diameter. For example, about 75–80 composite rods with a diameter of 0.97 mm (0.038 inches) will form a bundle diameter of 9.5 mm (0.375 inches). Depending on the characteristic design, the number, and size, and characteristic of the composite rods can be varied. It is also possible to include dissimilar composite rods and/or other types of materials to form the intermediate cable.

In step 2, 142, termination fittings having flaring internal cavities and an insert core fixation means are provided.

In step 3, 144, a plurality of composite rods are bundled together and inserted into the flaring internal cavity of the termination fitting, and the insert core is inserted therein to cause the individual composite rods to splay outwardly into contact with each other and the surfaces of the insert core and the cavity of the termination fitting. A locking means, such as closeout collar nut, is used to secure the insert core and the splayed-out composite rods in place.

In step 4, 146, adhesive is injected into the cavity formed between the insert core and the termination housing to cause the plurality of composite rods to be adhered to each other and to the inside surfaces of the insert core and the termination housing.

In step 5, 148, the plurality of composite rods are axially aligned, if necessary, and are placed under tension. Alternately, the composite rods could also be twisted in a twisted cable form.

In step 6, 150, steps 3–5 are repeated to secure a second termination fitting to the second end of the bundle of composite rods.

In step 7, 152, the plurality of composite rods are bound together, for example with a Kevlar® thread counter-helically wrapped. For additional weatherproofing and damage protection, a further overlapping layer can be applied.

The tension members of the invention can be formed in any lengths desired by providing users with spools of composite rod and various termination fittings, thereby allowing users to customize the desired length and characteristics of the tension member to be formed. For applications requiring extremely long sections of tension members, for example in mooring lines for deep sea offshore oil platforms, the termination ends of tension members can be adapted to fixably engage together (e.g., by threadable engagement or other means) to enable very long lengths to be put together (not shown). Indeed, in applications for mooring lines in offshore oil rigs, the length of the mooring lines can be so long that the weight of the cable itself exerts unacceptably high stresses on the cable, providing little additional strength to support the rig. The tension member of the invention would be ideal for this purpose.

As noted above, small composite rod elements provide a high strength means to affix terminations to composite tension members. The composite rod elements have a surface area to tensile strength relationship that allows the rods to be bonded into a resin termination plug with adequate strength. For example, a 1.0 mm (0.038 inch) diameter carbon/epoxy composite rod has an ultimate tensile strength of 225 kg (496 lbs.) A typical lap shear adhesive strength value for an epoxy resin bond is 280,533 kg/m$^2$ (4,000 p.s.i.) Therefore, there must be at least 8.0 mm$^2$ (0.124 square inches) of epoxy resin contact or insertion of the carbon rod into a resin termination plug in order to hold the strength of the carbon rod (e.g. 225 kg divided by 280,533 kg/m$^2$ (or 496 lbs. divided by 4,000 p.s.i.)) The 1.0 mm (0.038 inch) carbon rod must have an insertion length of at least 2.64 cm (1.039 inches) in order to achieve a lap shear area of at least 8.0 mm$^2$ (0.124 square inches.) If one attempts to make a 9.5 mm (⅜ inch) diameter carbon composite cable, the ultimate tensile strength would be nearly 17,270 kg (38,000 lbs.) However, it is not possible to crimp, swage or bond a termination fitting to a single monolithic 9.5 mm (⅜ inch) diameter carbon composite tension member that can match the strength of the 17,270 kg (⅜ inch) cable. Moreover, a glue joint to handle a 17,270 kg (38,000 lbs.) stress is not feasible. In theory the 17,270 kg (38,000 lbs.) load could be handled by gluing 20.3 cm (8 inches) of the 17,270 kg (⅜ inch) diameter rod into the termination. However, there is a stress concentration at the point where the rod is glued into the termination. The local stress concentration is greater than the lap shear capability of the adhesive. Consequently, there is a lap shear failure that propagates down the length of the glue joint. This is similar to the phenomena of tearing a telephone book page by page versus tearing all the pages at once. A 1.0 mm (0.038 inch) diameter rod has the same stress concentration, however the stress concentration is lower than the lap shear strength of the adhesive. Therefore, if the cable is made-up of 76 small carbon rods each at a diameter of 1.0 mm (0.038 inch) and bundled together to yield a 9.5 mm (⅜ inch) diameter cable; a sufficiently strong termination can be accomplished. Bonding of a single 1.0 mm (0.038 inch) diameter carbon composite rod into a terminus fitting can achieve about 90% of the strength of the theoretical limit of the rod. Utilizing a quantity of small composite rod elements to make a large cable or tension member also allows one to fine tune or tailor the strength of the final article relative to its weight by varying the number of rod elements. Having further described the theoretical basis for the invention, other embodiments of the invention are now described.

Turning to FIG. 12, there is shown a top plan view showing another embodiment of a terminating fitting 200 of the composite tension member of the invention prior to assembly. A cable 202 made of a plurality of composite rods has a terminal end 204 imbedded in a frustum-shaped plug 206. A termination fitting housing 208 is provided, and has a frustum-shaped opening 210 formed therein, which opening 210 is sized to closely receive the frustum-shaped plug 206. The termination fitting housing 208 has a distal threaded end 212 on a distal end 213 of the housing which receives a collar nut 214. The collar nut 214 acts to retain the frustum-shaped plug 206 and the carried cable 202 tightly in place in the frustum-shaped opening 210 in the termination fitting housing 208. Other means can be used to hold the frustum-shaped plug 206 in place.

FIG. 13 is a partially exposed top plan view showing the terminating fitting of FIG. 12 assembled and engaged with an eyehook 216, which is threadably engaged with a threaded bore 218 the collar nut 214. A lock nut 220 is used to retain the eyebolt 216 in the threaded collar nut 214. The O-ring is compressed to keep the frustum in place. It is not a seal. An O-ring 222 rides on a distal end 224 of the frustum-shaped plug 206 to help keep it in place. The cable 204 is shown with its sheathing 226 partially removed to reveal binding thread 228 wrapped around the plurality of composite rods 230 to hold them in a bundle, yet permit any necessary sliding movement of the individual composite rods 230 during assembly of the composite tension member.

FIG. 14 is a cross-sectional view of the frustum plug 206 taken along view lines 14—14 of FIG. 12. A plurality of individual composite rods 230 shown without any over-wrapping or sheathing are formed into the composite cable portion 202, and they are splayed slightly from a narrower, proximal end 232, where they enter the frustum plug 206, to the wider, distal end 234. The reason for the slight splaying is to permit good contact between all of the individual composite rods 230 and the resin material 236 (e.g. epoxy resin) from which the frustum plug 206 is formed. This good contact between the individual composite rods 230 and the material of the frustum plug achieves a very high strength and prevents the composite rods 230 from pulling loose from the frustum plug even under tension that would break the composite cable, thereby avoiding failure of the composite tension member at the termination fittings. Chopped or milled glass fiber or particulate filter can be added to the epoxy for the conical plug in order to increase the strength of the conical plug material.

As a tension load is applied to the cable assembly, the frustum-shaped plug is drawn down into the fitting. Since the fitting has significant hoop strength and stiffness, the tensile load on the frustum plug results in a compressive force on the frustum plug normal to the conical wedge angle. The compressive force on the frustum plug also creates a compressive force on the small composite rods which increases the lap shear adhesion of the rods to the frustum plug. The frustum plug must precisely fit the fitting in order to create uniform compression on the conical plug and the embedded composite rods. The frustum resin plug is permitted to slip minimally in the frustum fitting so that a wedge force is created. Since an exemplary frustum plug of the invention made from readily available materials has a maximum compressive strength of only about 4,500 p.s.i., it is necessary to make the frustum plug large enough so it can handle the compressive force applied to it. The frustum plug must be designed such that the ratio of the frustum plug surface area to the maximum tensile stress of the cable is within the compressive strength capability of the frustum resin plug. The included angle of the fitting has great effect on the wedge forces generated as the composite tension member is under tensile stress. The greater the angle, the less compressive load or wedge effect. Less wedge angle creates greater compressive force on the frustum resin plug. Also, a larger angle creates a larger and heavier fitting while the smaller angle creates a smaller, more lightweight and more streamlined fitting. The inventor has found that about a 15 degree included angle ($\alpha$=about 7.5 degrees per side) is a good compromise between achieving maximum strength for the terminus and the design goal of accomplishing a small lightweight cable assembly. At about a 15 degrees included angle, the force normal to the surface of the frustum wedge is significantly greater than the tensile load on the overall tension member assembly (approximately 1.6 times the tensile load). The wedge force develops a significant compressive force on the frustum wedge and significantly enhances the adhesion of the small carbon composite rods within the frustum wedge.

As noted, the frustum-shaped resin plug can be made out of a structural epoxy resin. The frustum-shaped resin plug is a critical structural component of the tension member termination. However, the compressive strength, shear strength and modulus of the epoxy resin is lower than either the carbon composite tension member rods or the metallic fitting. The tensile load is transferred from the carbon rods into the resin plug and then into the metallic fitting. A key factor in the ability of epoxy resin, which is a weaker material, to transfer load, is to increase in mechanical properties as the tensile stress increases on the tension member. Since the frustum-shaped resin plug is contained in the metallic fitting it undergoes compression. Captured compression on a plastic material increases the mechanical properties of the plastic material. The plastic material under compression becomes more dense thereby improving its strength and modulus.

FIG. 15 is a top plan view showing a one part of a mold 240 for forming the frustum plugs 206 with embedded composite rod or rods therein. As shown, a bundle 242 of individual composite rods 230 are placed in a mold 240 having a channel 244 for receiving the bundle of rods. Each composite rod 230 is threaded through a carding plate 246 which is engaged with the mold and separates the distal ends of the composite rods 230. Another part of the mold (not shown) is then engaged with the first part of the mold 240 and resin is injected through a port 248 to fill the spaces between the composite rods 236 with resin to encapsulate the carbon rods and to form a frustum resin plug. The mold can be heated to cure the resin. After the resin is cured, the cable and the cast resin plug and the carding plate 246 are removed from the mold, and the composite rods extending beyond the distal end of the frustum plug are cut off. Good results are achieved with structural epoxy resin. The epoxy used can be filled with milled glass fibers (for example 10% by volume) to increase its compressive strength. The epoxy resin can be vacuum de-aired to remove any air bubbles present in the resin mix prior to injecting the resin in the mold. As an option, just prior to injecting the conical resin plug, a special high elongation resin mix can be applied to the rods. The special resin mix can comprise 1 part Epon™ 828 brand resin to up to 1.5 parts Epicure™ 3140 brand curing agent, both offered by Resolution Performance Products, of Houston, Tex. This special resin mix has an elongation around 100%. However, other products can be used.

Fumed Silica can also be added to the resin mix at a 1 to 1 volume ratio. The special resin mix is thixotropic due to the addition of fumed silica. The special resin mix can be applied to the carbon rods with a small brush. The special resin mix will coat the surface of the carbon rods with about 1–2 mils coating thickness. The effect of the special resin mix is to increase the strength of retention of the carbon rods in the frustum-shaped resin plug by reducing the local stress concentration where the rods enter the frustum-shaped resin plug. The inventor has found that the composite rods should be embedded in the about 15 degree frustum plug with as little bend or splay as possible. In other words, the composite rods should ideally be positioned close to the axial center of the frustum plug to maintain the maximum strength. It is necessary to splay the small composite rods out a small amount simply to flow resin around the rods during the process of molding the frustum plug. However, the rods should have as little bend as possible because a kink reduces the ultimate strength of each rod.

There is a common steel wire rope termination fitting available with a poured resin plug somewhat similar in concept to the inventor's composite frustum plug. However, there are some key differences. In steel cable, the wires are randomly bent outward with no concern for their position. In steel wire cable, no effort is made to equally tension the wire elements. A polyester resin is cast around the steel wire elements with the fitting in a vertical position. The polyester resin is cast in the fitting itself to lock the steel wire rope elements into the fitting. In the inventor's composite cable technology the composite rod elements are carefully controlled relative to the positioning of the rods embedded in the frustum plug and relative to the tensioning of the composite rods. Careful positioning of the rods in the frustum plug and evenly tensioning the rods is important in achieving a reliable composite termination fitting with maximum strength.

FIG. 16 is a diagrammatic view showing a setup for forming composite tension members of the invention. A horizontal track 260 carries the mold 240. A bundle of composite rods 262 enters the mold 240, and distal ends of the plurality of composite rods 230 pass therethrough, and exit and are routed through a second carding plate 264 that is placed on the horizontal track 260. Clips 266 are attached near the terminal ends of the composite rods 230. In turn, the clips 266 are attached to strings 268. In order to establish even tension on the individual composite rods 230 resin frustum plug being formed, equal weights 270 are hung from the lines 268, such as from pulleys 272. In lieu of weights, springs placed on the same degree of tension could also be used to set up equal tension in all of the composite rods in the bundle of composite rods. One advantage of this horizontal assembly arrangement is that it permits very long lengths of composite tension members to be formed. Since composite rods have very high tensile strength but are not very stretchable, if some rods are made to bear more tension than other rods, it is possible for those rods to break early, thereby decreasing the strength of the cable. It is therefore important that during the process of forming the frustum plug that each rod be placed under the same tension, to avoid situations where some rods are made to carry more tension than other rods.

FIG. 17 is a diagrammatic view showing a composite tension member 290 having a minimal weakening bend 292 along the length of the cable portion being formed. A frustum plug is formed at one end of the cable portion, and the bundle of composite rods is bent on form 294 to assume the contour the composite tension member will take when installed. An example is an installations of the composite tension member as upper shrouds in sailboats, where the upper shroud bends around spreaders extending from the mast. When the bundle of composite rods is bent on form 294, the individual composite rods 230 in the bundle will be permitted to slide relative to each other, with the outside of the bends having a longer length and the inside of the bends having a shorter length. Depending on the degree of bend and diameter of the finished bundle of rods, the difference in lengths of the individual rods can be quite substantial. Thereafter, the final frustum plug is formed on the terminal end. This results in no uneven force being placed on the different composite rods making up the composite tension member. This contrasts with cable and rods, where there are stresses in the bend area, which stresses cause weakening in the bend area. Each carbon rod is allowed to find its natural path so that as a load is applied all the carbon rods equally share the load. In contrast, in a cable made straight and then bent over a spreader, some of the rods are slack and therefore the outer rods must carry all the load. A cable manufactured with various length rods specifically for spreaders can only be used for that specific spreader geometry.

It is beneficial for the composite cable to have a protective jacket layer over the outside. The purpose of the protective jacket is to provide damage protection to the composite rod bundle and protection from the elements such as UV light, which may degrade the properties of the composite rods over extended periods of time. Normally, one might extrude a plastic or rubber jacket over the composite cable bundle as typical in the electrical wire industry. One would then strip-off the extruded jacket in the area where the terminus fittings are to be installed. However, extrusion of a jacket is not ideal for this application because various lengths of cable must be manufactured and the composite rods must be the same length and under the same tension when assembled with the terminus fittings. The extruded jacket might prevent the composite rods from sliding relative to each other and would hinder the ability to insure that the individual rods are straight and under the same tension. It is therefore necessary to install a protective jacket on the cable after the terminus fittings are fabricated and assembled. Installing the jacket after the terminus fittings are installed also makes it easier to insure that the protective jacket fits closely up to the terminus fittings. The inventor has developed ways of fabricating the protective jacket layer between the terminus fittings. One representative way is to bind the cable bundle with a light weight synthetic fiber, such as an Aramid fiber thread or Kevlar® to hold the composite rods together tightly in a round package. Next a layer of uncured B-staged neoprene rubber is applied over the outside of the cable bundle with an axial overlap seam. The typical uncured rubber thickness is about 0.76 mm (0.030 inches.) Next, a split silicone rubber tube is placed over the composite cable assembly to act as a caul sheet but in a tubular form. A helical wrap of nylon shrink film is then applied over the silicone tube and uncured rubber jacket and cable bundle. The cable is placed in a long tunnel oven and heat is applied at about 148° C. (300° F.) for about 1 hour. The heat shrinks the nylon shrink film down on the silicone caul tube and the uncured rubber and compacts the rubber around the composite cable. The uncured rubber cures with heat. After the assembly has been allowed to cool down and is removed from the oven, the shrink film and silicone tube are removed. The result is a durable protective coating on the outside of the cable that fits precisely up to the terminus fittings. A nylon vacuum bag can also be used in lieu of the shrink film to apply pressure to the silicone caul tube and the cable assembly during cure of the rubber jacket.

Uncured silicone rubber can also be used for the cable jacket. Additionally, if desired, fine fiberglass fabric or other strong fibers can be used in the uncured rubber sheet to add additional damage resistance to the cable jacket.

FIG. 18 is a top plan view showing a termination fitting 300 overwrapped with a high strength composite material such as carbon fiber or Kevlar® or glass fiber to provide for enhanced hoop strength. The wrapping material can be wrapped around the frustum-shaped portion 304 of the termination housing since this is where the hoop stress will be greatest. As noted above, the metallic fitting captures and holds the resin frustum plug under a tensile load. The metallic fitting also provides a means of attaching the tension member ends to whatever is being held or restrained by the tension member. In the case of the composite yacht standing rigging, the metallic fitting interfaces with the mast and/or boat hardware. The metallic fitting is subjected to two basic loads. The first load is the tensile load. The second load is the hoop load on the fitting as the frustum plug wedges into the fitting under stress. The basic geometry of the terminus usually insures that there is adequate metal material to handle the tensile loads. However, significantly more metal thickness is required in the fitting design to handle the hoop stress imposed as tension is applied to the cable and the frustum plug is pulled down into the fitting. It is very important for the metallic fitting to have a very high degree of hoop stiffness for the termination technology to work. If the metallic fitting yields (elastically or permanently) as the frustum plug is pulled down into the fitting, compression on the frustum wedge will not be created and the beneficial effect to hold the composite rods in the resin wedge will not be achieved. For this purpose, the inventor developed a carbon fiber reinforced fitting to create high hoop stiffness in the metallic fitting without inordinate weight increase. Carbon fiber composite is wrapped around the metallic fitting in the area around the conical wedge to reinforce the fitting. The carbon fiber wrap can be varied to suit the strength requirements of a particular size fitting. With this design, the metallic portion of the fitting can be optimally sized just to handle the tensile loads while the hoop loads are handled by the lighter weight and higher strength carbon fiber wrap. The hybrid metallic/composite termination fitting design is overall lighter in weight than a design made only out of metal. An epoxy adhesive film layer is ideally included between the carbon fiber over-wrap and the metallic fitting to enhance the bond of the composite to the metallic fitting and to provide a dielectric barrier to prevent the possibility of electrolytic damage between the dissimilar materials when they are exposed to saltwater.

FIG. 19 is a top plan view showing another termination fitting 310 with a cable portion 312 having a unitary composite rod. An attachment 314 attaches to the termination housing 316. Areas 318 is a detail shown in expanded scale in FIG. 20, and shows a portion of a frustum resin plug 320 in the housing 322, an end of attachment 314 screwed together with the termination housing 316. An O-ring 324 can be used to hold the assembly together without looseness between the parts of the assembly. In manufacturing the unitary composite rod forming the cable portion 312 can be coated with polyurethane to obviate the need for additional overwrapping materials. As previously described the unitary composite rod is most suitable for small lightly loaded tension members 3.18 mm (⅛ inch) diameter or less. This concept can be used for small sailing dinghies and catamarans.

FIG. 21 is a top plan view showing an embodiment of an assembled composite tension member 340 of the invention with a cable portion 342 with terminations 344 and 346 affixed to ends of the cable portion. Termination 344 has an eyehook 348 and termination 346 has a swivel bail 350. Area 352 is a detail shown in expanded scale in FIG. 22, and shows a portion of a frustum resin plug 354 in the housing 356, a collar nut 358 screwed together with the housing 356. An O-ring 360 can be used to seal the unit.

Figure 23:
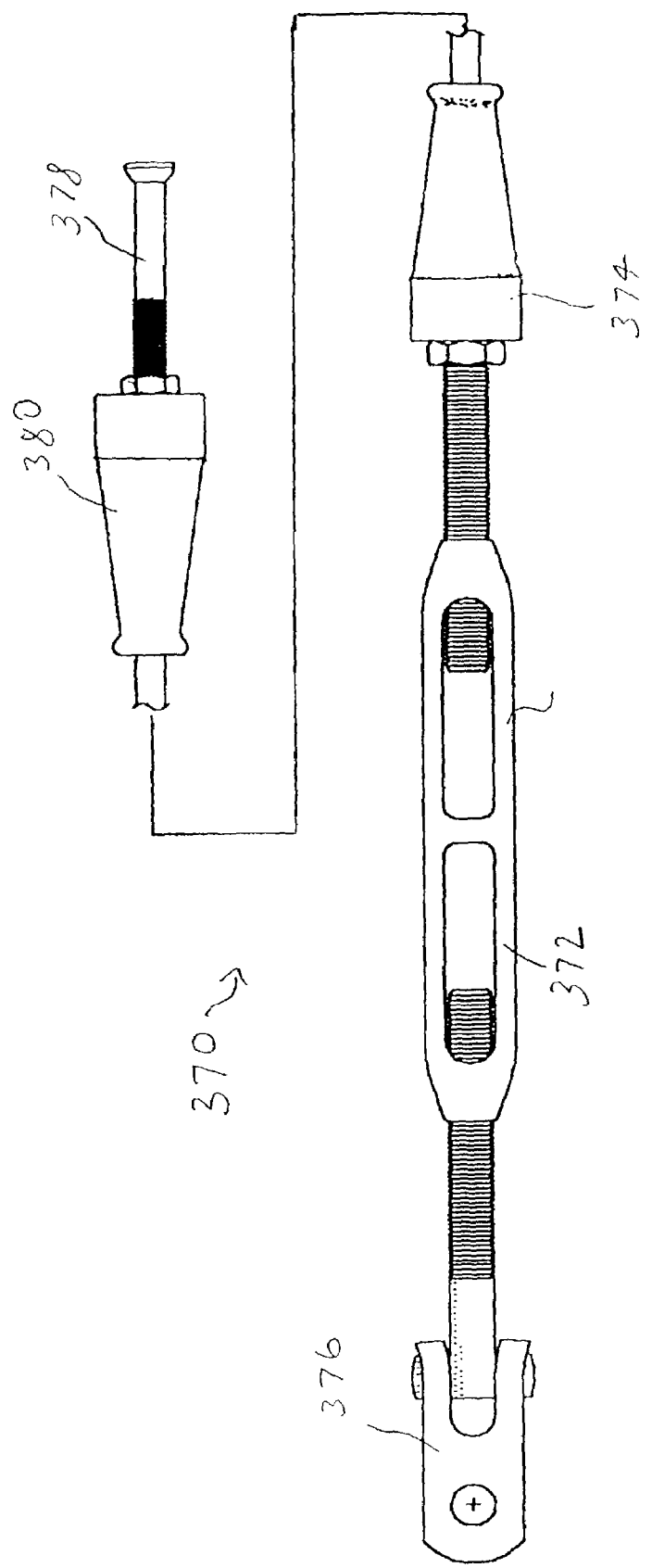
FIG. 23 is a top plan view showing another assembled composite tension member of the invention with a turnbuckle.

FIG. 23 is a top plan view showing another assembled composite tension member of the invention 370 with a turnbuckle 370 used to bridge between one termination housing 374 and a strap bracket 376. A ballhead screw 378 is engaged with the other termination housing 380.

Figure 24:
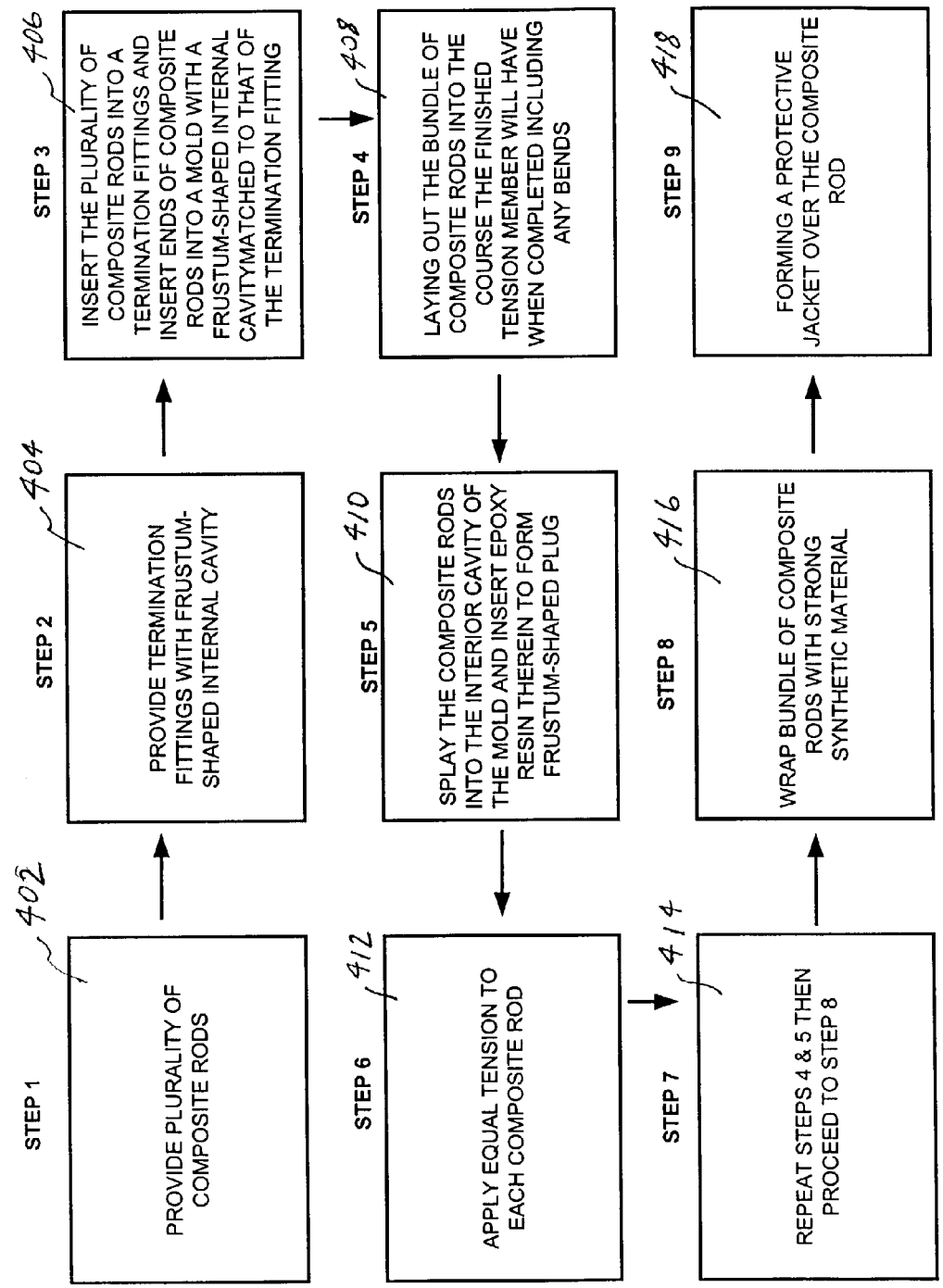
FIG. 24 is a flow chart showing a method of forming the composite tension member of the invention.

FIG. 24 is a flow chart 40 showing a method of forming the composite tension member of the invention. In step 1, 402 a plurality of composite rods are provided. In step 2, 404 termination fittings with frustum-shaped internal cavity are provided. In step 3, 406 the plurality of composite rods are inserted into a termination fittings and ends of composite rods are inserted into a mold with a frustum-shaped internal cavity matched to that of the termination fitting. In step 4, 408 the bundle of composite rods are laid out into the course the finished tension member will have when completed including any bends. In step 5, 410 equal tension is applied to each composite rod. In step 6, 412 the composite rods are splayed slightly into the interior cavity of the mold and insert epoxy resin therein to form frustum-shaped plug. In step 7, 414 steps 4 & 5 are repeated. In step 8, 416 the bundle of composite rods are wrapped with strong synthetic material. And in step 9, 418 a protective jacket is formed over the composite rod.

Figure 25:
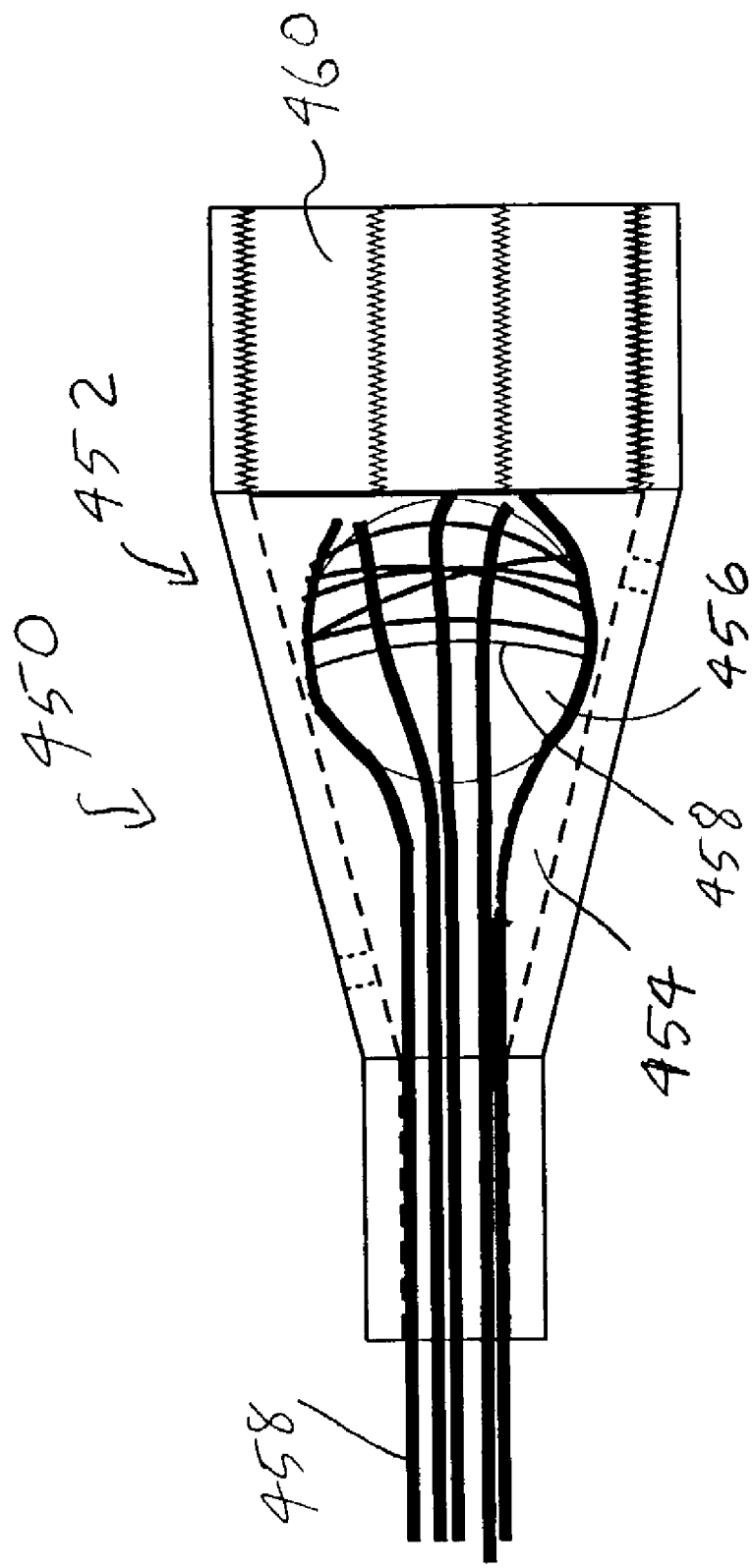
FIG. 25 is a partially exposed sectional view of another embodiment of a composite tension member termination fitting.

FIG. 25 is a partially exposed sectional view of another embodiment of a composite tension member termination fitting 450, which has a termination housing 552 with a cavity 554 into which a metal ball 556 is inserted. The plurality of composite rods 458 (of which just a few are shown) are pressed into contact with the ball 456, and can be seized with strong hoop wrap of composite fiber material 458. Tying the rods 458 are tied around the ball 456 further locks the rods in place. The space not occupied by the ball and rods is filled with resin, and a collar nut 460 can be used to retain the ball 456 in place.

Figure 26:
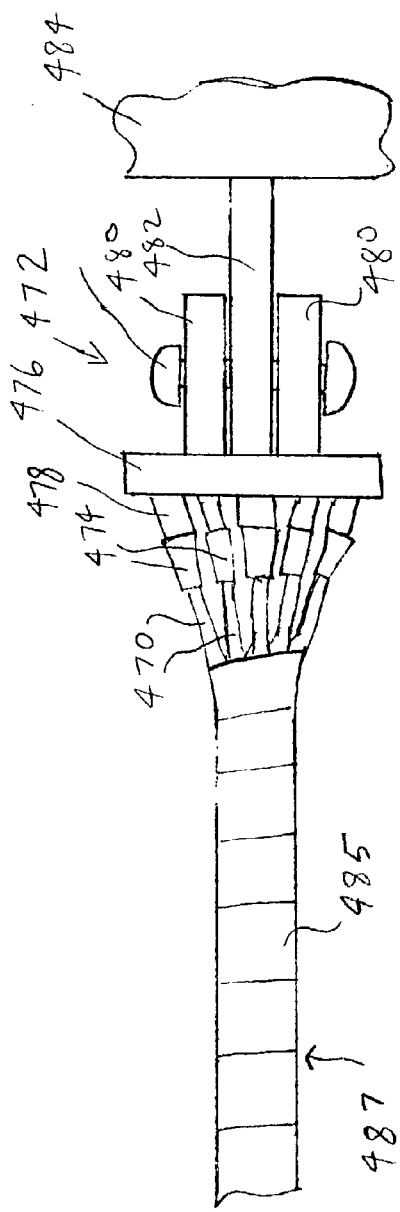
FIG. 26 is a top view showing an embodiment of the invention where a plurality of composite tension members are joined to a clevis pin joint.

FIG. 26 is a top view showing an embodiment of the invention where a plurality of composite tension members 470 are joined to a clevis pin joint 472. Each composite tension members 470 has a termination fitting 474 which attached to a collector plate 476 with pivot devices 478. Clevis extensions 480 extend from the back of the collector plate 476 and a clevis plate 482 extends from a restraint item 484. A pin 486 passes through apertures (not shown) in the clevis extensions 480 and the clevis plate 480 to permit pivoting of the clevis joint relative to the restraint item 484. The plurality of composite tension members 470 are overwrapped with a composite wrapping 485 to form a bundle of composite tension members 487.

Figure 27:
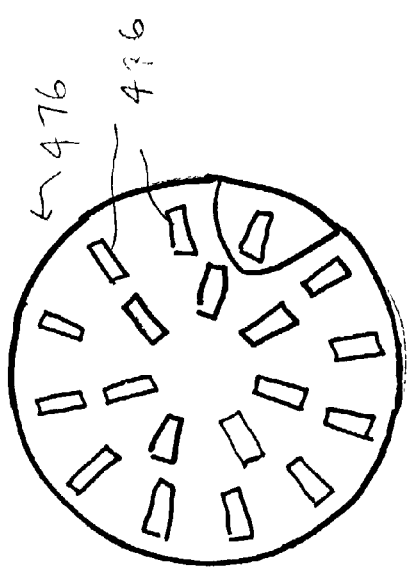
FIG. 27 is a top plan vice showing a collector plate of the clevis pin joint.

FIG. 27 is a top plan vice showing the collector plate 476, and has a plurality of ears 486 extending therefrom.

Figure 28:
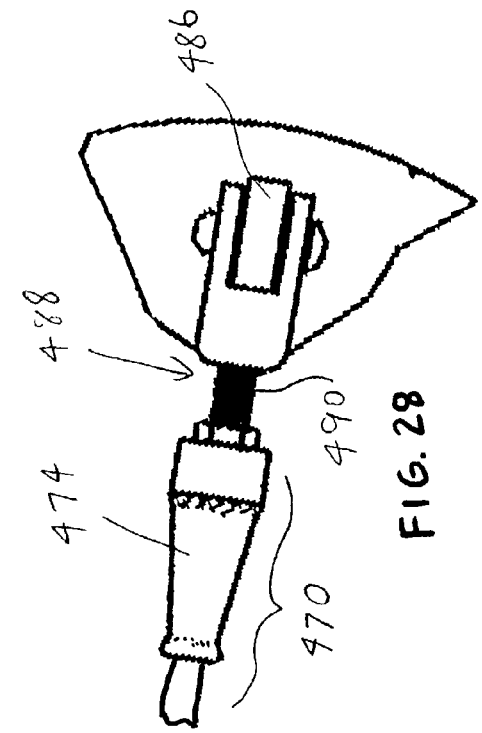
FIG. 28 is a detail showing a pivot device for carrying one tension member on the collector plate.

FIG. 28 is a detail showing a pivot device 488 for carrying one tension member 470 on the collector plate. Each pivot device 488 pivotally engages with an ear 486, and has a threaded rod 490 which engages with the termination fitting 474.

Although the invention has been described with reference to frustum-shaped plugs to hold a single composite rod or plurality of rods, the plugs can have other shapes such as flattened frustum shape, pyramid-shape and other shapes.

Having thus described exemplary embodiments of the present invention, it should be understood by those skilled in the art that the above disclosures are exemplary only and that various other alternatives, adaptations and modifications may be made within the scope of the present invention. The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. A composite tension member, comprising:
   a plurality of composite rods arranged in a generally parallel orientation in a bundle, each bundle having two ends;
   a wedge plug formed around at least one end of the composite rods, wherein the plurality of composite rods in the wedge plug are splayed out in a widened orientation in the wedge plug from a vicinity of where the plurality of composite rods enter a proximal, narrower end of the wedge plug to a distal, wider end of the wedge plug, and wherein the wedge plug is formed from a material that bonds to the plurality of composite rods located therein; and
   at least one termination fitting with a termination fitting body having an aperture at a proximal end for receipt of the bundle of composite rods, and having an internal cavity that flares outwardly from a proximal end to a distal end to closely fit and receive the wedge plug.

2. The composite tension member of claim 1, further comprising a compression member engagable with the termination fitting body to apply a compression force to and retain the wedge plug in the internal cavity.

3. The composite tension member of claim 2, wherein the compression member is a collar nut that is engagable with a threaded shaft used to attach the composite tension member to other objects.

4. The composite tension member of claim 1, wherein the wedge plug is formed of resin that is cast around an outer surface of the plurality of composite rods so that the rods are bonded within the resin of the wedge plug, with the composite rods being placed under generally the same lateral tension.

5. The composite tension member of claim 4, wherein the resin is reinforced with at least one of fibers and particulate fillers.

6. The composite tension member of claim 1, wherein the wedge plug is frustum-shaped.

7. The composite tension member of claim 6, wherein the side walls of the frustum-shaped plug are angled apart by about 15 degrees.

8. The composite tension member of claim 1, wherein the termination fitting body is formed of metal and is at least partially overwrapped with hoop strength enhancing material.

9. The composite tension member of claim 1, wherein the plurality of composite rods are overwrapped with a synthetic material to retain the plurality of composite rods in a generally parallel orientation in a bundle, and the bundle is covered with a protective layer of material.

10. The composite tension member of claim 9, wherein the protective layer of material provides an airfoil profile.

11. The composite tension member of claim 1, wherein the plurality of composite rods are parallel and generally under the same tension when the composite tension member is in its finished profile.

12. The composite tension member of claim 1, wherein the composite rods are selected from the group consisting of carbon-fiber and resin, glass-fiber and resin, and synthetic material and resin.

13. The composite tension member of claim 1, wherein the wedge plug is formed before being positioned in the aperture of the termination fitting body, and no additional resin is placed between the wedge plug and the aperture of the termination fitting body.

14. A method for forming composite tension cable tension members having desired lengths, tensile strength, and profile characteristics, comprising the following and not necessarily in order steps of:
   (a) providing a plurality of composite rods that are arranged in a bundle, each of the plurality of composite rods having an outer surface and having first and second ends;
   (b) providing termination fittings, each fitting having a frustum-shaped internal cavity with a narrower entrance and a wider exit;
   (c) inserting the first ends of the plurality of composite rods into the entrance of one termination fitting and inserting the first ends of plurality of composite rods into a mold with a frustum-shaped internal cavity;
   (d) splaying the composite rods slightly into the interior cavity of the mold and inserting resin therein to form a frustum-shaped plug that is cast around the plurality of the splayed composite rods, with the outer surface area of the composite rods being bonded in the resin plug, the frustum-shaped plug being sized and shaped to closely fit into the frustum-shaped internal cavity of the termination fitting;
   (e) laying out the bundle of composite rods along a course the finished composite tension cable member will have when completed, including any bends;
   (f) applying generally equal tension to each composite rod in the bundle of rods;
   (g) repeating steps (c) and (d) with respect to another termination fitting while equal tension is continued to be applied to each composite rod in the bundle of rods; and
   (h) forming a protective layer around the bundle of rods.

15. The method of claim 14, further comprising the step of wrapping the bundle of composite rods with strong synthetic material before step (h).

16. The method of claim 14, wherein the plurality of composite rods are laid out in a generally horizontal orientation and the step of applying equal tension to each composite rod in the bundle of rods is achieved by attaching lines with equal weights attached thereto and hanging from pulleys to ends of the composite rods during the step of forming the frustum-shaped plug thereon.

17. The method of claim 14, wherein the resin inserted into the mold is reinforced resin.

18. A composite tension member, comprising:
   a plurality of composite rods, each composite rod having an outer surface, the composite rods being arranged in a bundle, each bundle having two ends;
   a composite wedge plug formed around at least one end of the bundle of composite rods, the composite rods in the wedge plug being splayed out in a widening orientation in the wedge plug from a point at which the plurality of composite rods enter the wedge plug to an opposite end of the wedge plug, the wedge plug being formed from a resin that bonds to the outer surface of composite rods located therein, the wedge plug having a wedge-shaped outer contour;

at least one termination fitting with a termination fitting body having an aperture with an internal cavity that is sized and shaped to closely receive the wedge plug therein, the termination fitting being adapted to attach to other structures.

19. The composite tension member of claim 18, wherein the plurality of composite rods are parallel and placed generally under the same tension when the composite tension member is in its finished profile and is tensioned in a longitudinal direction.

20. The composite tension member of claim 18, further comprising a compression member engagable with the termination fitting body to apply a compression force on the wedge plug in the internal cavity to further increase the bond strength of the resin to the composite rods.

21. The composite tension member of claim 18, wherein the resin used to form the composite wedge plug is additionally reinforced with at least one of fibers and particulate fillers.

22. The composite tension member of claim 18, wherein the termination fitting body is formed of metal and is at least partially overwrapped with hoop strength enhancing material.

23. The composite tension member of claim 18, wherein the plurality of composite rods are overwrapped with a synthetic material to retain the plurality of composite rods in a generally parallel orientation in a bundle, and the bundle is covered with a protective layer of material.

* * * * *